United States Patent
Sekigawa

(10) Patent No.: US 12,019,868 B2
(45) Date of Patent: Jun. 25, 2024

(54) MEMORY SYSTEM AND METHOD OF CONTROLLING NON-VOLATILE MEMORY

(71) Applicant: Kioxia Corporation, Tokyo (JP)

(72) Inventor: Shizuka Sekigawa, Tokyo (JP)

(73) Assignee: KIOXIA CORPORATION, Tokyo (JP)

( * ) Notice: Subject to any disclaimer, the term of this patent is extended or adjusted under 35 U.S.C. 154(b) by 77 days.

(21) Appl. No.: 17/685,952

(22) Filed: Mar. 3, 2022

(65) Prior Publication Data
US 2023/0040735 A1 Feb. 9, 2023

(30) Foreign Application Priority Data

Aug. 6, 2021 (JP) .................................. 2021-129985

(51) Int. Cl.
*G06F 3/06* (2006.01)

(52) U.S. Cl.
CPC .......... *G06F 3/0604* (2013.01); *G06F 3/0655* (2013.01); *G06F 3/0679* (2013.01)

(58) Field of Classification Search
CPC .... G06F 3/0604; G06F 3/0607; G06F 3/0655; G06F 3/0659; G06F 3/0679
USPC .................................................. 711/154, 103
See application file for complete search history.

(56) References Cited

U.S. PATENT DOCUMENTS

| | | | |
|---|---|---|---|
| 9,053,008 B1 | 6/2015 | Horn et al. | |
| 10,073,643 B2 | 9/2018 | Jung et al. | |
| 2013/0290614 A1 | 10/2013 | Yoon et al. | |
| 2015/0355705 A1 | 12/2015 | Weissmann et al. | |
| 2016/0118121 A1 | 4/2016 | Kelly et al. | |
| 2016/0321002 A1* | 11/2016 | Jung | G06F 12/0246 |
| 2017/0052716 A1 | 2/2017 | Jenne et al. | |
| 2018/0336960 A1* | 11/2018 | Chu | G06F 11/3034 |
| 2020/0073555 A1* | 3/2020 | Iijima | G06F 3/061 |
| 2020/0387425 A1* | 12/2020 | Igahara | G06F 3/0679 |
| 2022/0113877 A1* | 4/2022 | Kim | G06F 3/0611 |

FOREIGN PATENT DOCUMENTS

| | | |
|---|---|---|
| JP | 2007-026136 A | 2/2007 |
| TW | 201612683 A | 4/2016 |

* cited by examiner

*Primary Examiner* — Hashem Farrokh
(74) *Attorney, Agent, or Firm* — Foley & Lardner LLP

(57) ABSTRACT

A memory system includes a non-volatile memory and a controller. The non-volatile memory includes at least one memory chip. The controller is electrically coupled to the non-volatile memory. The controller transmits a first instruction to the non-volatile memory, and transmits a second instruction to the non-volatile memory after transmitting the first instruction. The first instruction and the second instruction form a series of sequences. In a case where the non-volatile memory satisfies a condition, the second instruction is transmitted to the non-volatile memory after a first period following transmission of the first instruction elapses. In a case where the non-volatile memory does not satisfy the condition, the second instruction is transmitted to the non-volatile memory after a second period following transmission of the first instruction elapses. The second period is different from the first period.

18 Claims, 10 Drawing Sheets

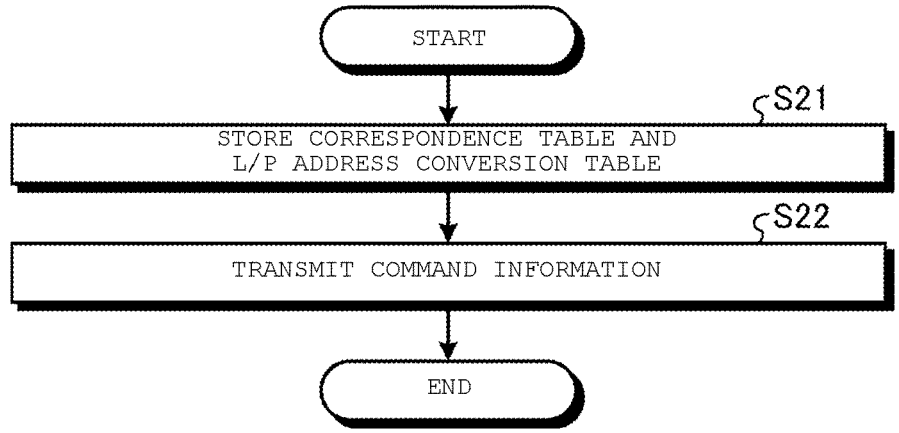
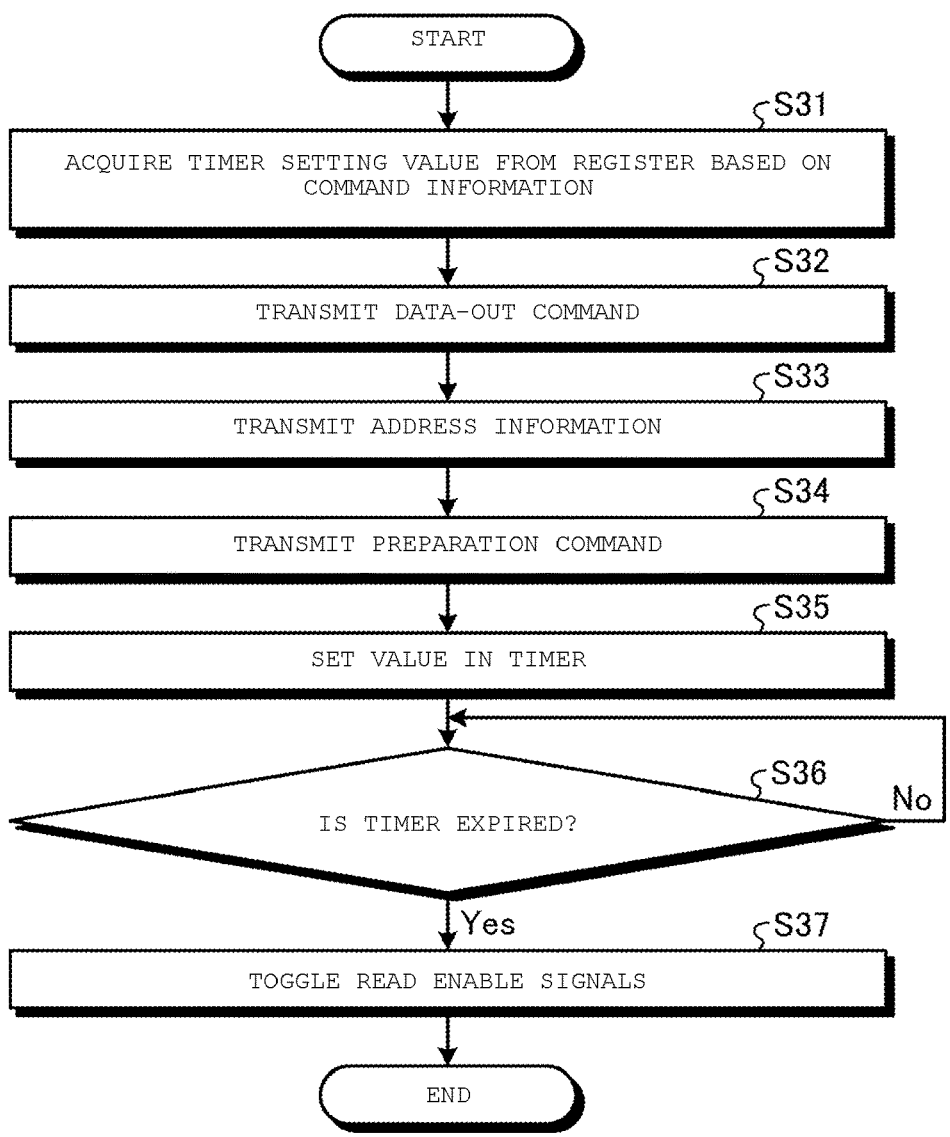

MEMORY SYSTEM AND METHOD OF CONTROLLING NON-VOLATILE MEMORY

CROSS-REFERENCE TO RELATED APPLICATION

This application is based upon and claims the benefit of priority from Japanese Patent Application No. 2021-129985, filed Aug. 6, 2021, the entire contents of which are incorporated herein by reference.

FIELD

Embodiments described herein relate generally to a memory system.

BACKGROUND

In a memory system that includes a memory controller and a non-volatile memory, the non-volatile memory may include an interface chip. The time required for the memory controller to access the non-volatile memory varies depending on whether the non-volatile memory includes an interface chip.

DESCRIPTION OF THE DRAWINGS

FIG. 8 is a flowchart illustrating a procedure of generation processing of command information according to at least one embodiment.

FIG. 9 is a flowchart illustrating a procedure of data-out processing of a read operation according to a modification example.

DETAILED DESCRIPTION

Embodiments provide a memory system capable of appropriately controlling access to a non-volatile memory.

In general, according to at least one embodiment, a memory system includes a non-volatile memory and a controller. The non-volatile memory includes at least one memory chip. The controller is electrically coupled to the non-volatile memory. The controller transmits a first instruction to the non-volatile memory, and transmits a second instruction to the non-volatile memory after transmitting the first instruction. The first instruction and the second instruction form a series of sequences. In a case where the non-volatile memory satisfies a condition, the second instruction is transmitted to the non-volatile memory after a first period following transmission of the first instruction elapses. In a case where the non-volatile memory does not satisfy the condition, the second instruction is transmitted to the non-volatile memory after a second period following transmission of the first instruction elapses. The second period is different from the first period.

The memory system according to at least one embodiment will be described in detail with reference to the accompanying drawings below. The elements in the following embodiments include those that can be easily assumed by those skilled in the art or those that are substantially the same. The present disclosure is not limited to these embodiments.

Example of Configuration of Memory System

Figure 1:
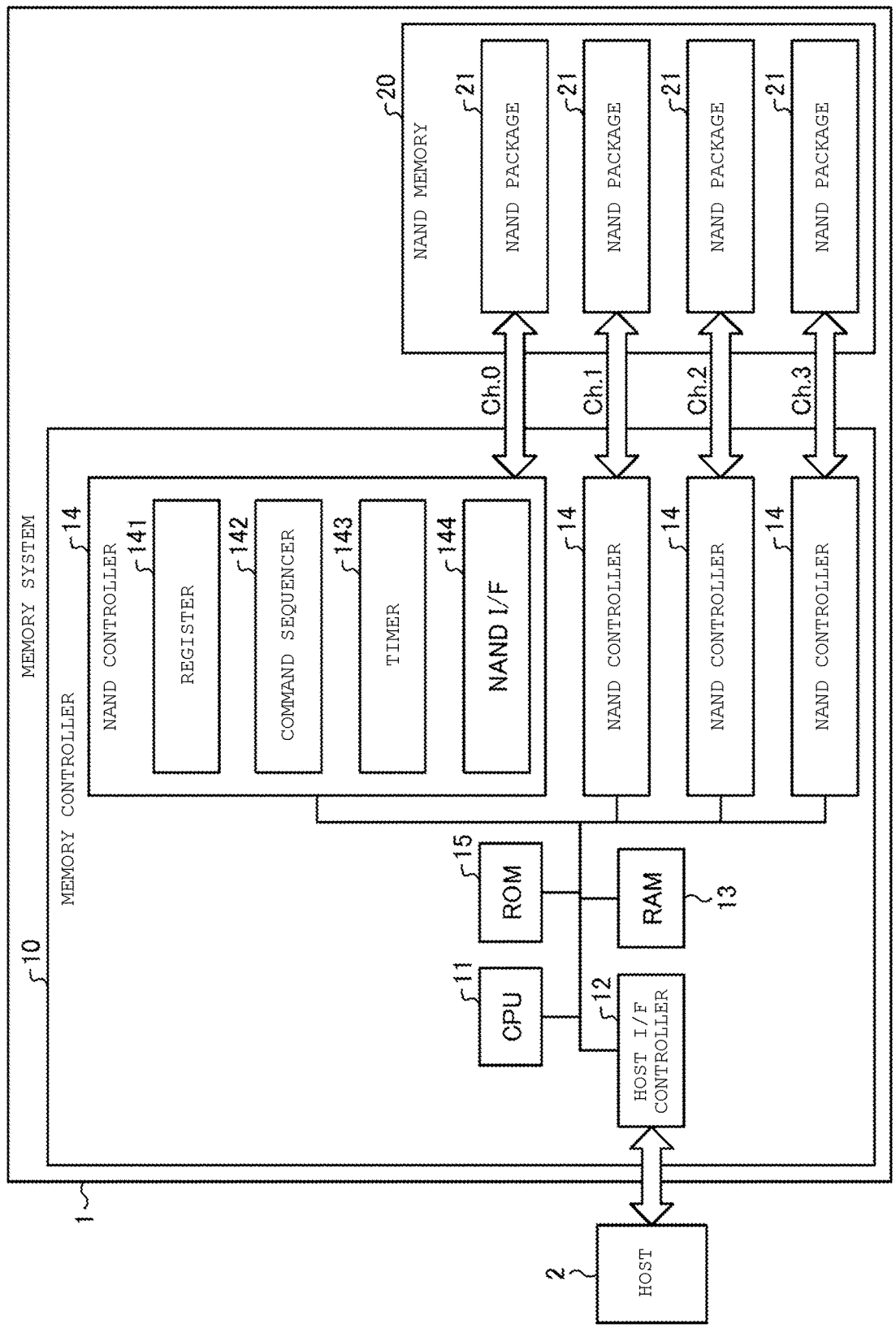
FIG. 1 is a diagram illustrating an example of a configuration of a memory system according to at least one embodiment.

FIG. 1 is a diagram illustrating an example of a configuration of a memory system 1 according to the embodiment. As illustrated in FIG. 1, the memory system 1 includes a memory controller 10 and a NAND flash memory 20 (hereinafter, referred to as a "NAND memory 20"). The memory system 1 may be coupled to a host 2.

Figure 2A:
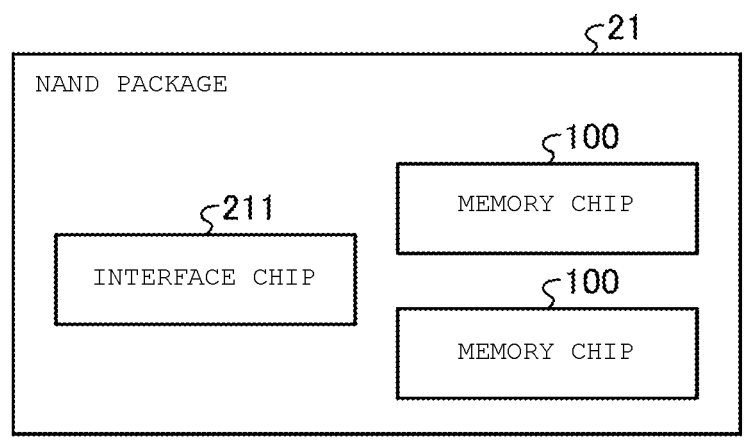
FIG. 2A is a diagram illustrating an example of a configuration of a NAND package including an interface chip according to at least one embodiment.
Figure 2B:
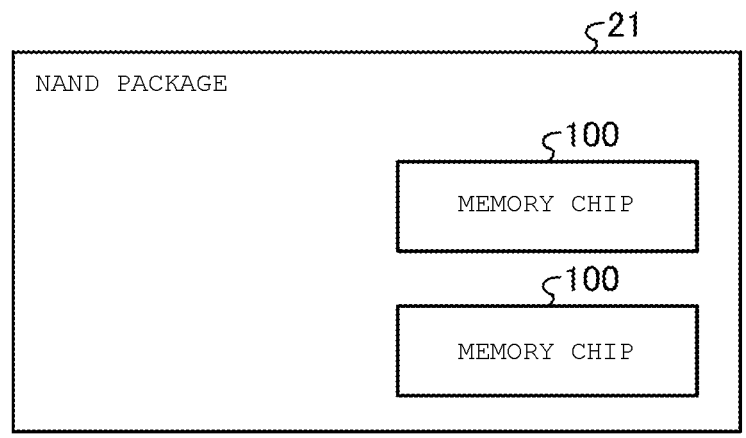
FIG. 2B is a diagram illustrating an example of a configuration of a NAND package that does not include the interface chip according to at least one embodiment.

The NAND memory 20 is a non-volatile memory. The NAND memory 20 includes a plurality of NAND packages 21. Each NAND package 21 includes a plurality of memory chips. Here, FIGS. 2A and 2B illustrate an example of the NAND package 21. In one example, as illustrated in FIG. 2A, the NAND package 21 includes a plurality of memory chips 100 and an interface chip 211. In another example, as illustrated in FIG. 2B, the NAND package 21 does not include the interface chip 211, but includes a plurality of memory chips 100.

The interface chip 211 is coupled between the memory controller 10 and some memory chips 100. The interface chip 211 can relay transferring of data and various commands (including a read command, a write command, and an erase command described later) for the memory controller 10 to control the target memory chip 100. Further, the interface chip 211 includes a buffer therein, and stores various commands, data, and the like in the buffer.

Return to FIG. 1. In the memory system 1, any number of NAND packages 21 may be provided in the NAND memory 20. Further, any number of memory chips 100 may be provided in the NAND package 21.

The type of non-volatile memory provided in the memory system 1 is not limited to the NAND flash memory. The memory system 1 may include other types of memory such as magnetoresistive random access memory (MRAM), phase change random access memory (PCRAM), and resistive random access memory (ReRAM), instead of the NAND flash memory.

The memory controller 10 may be configured as, for example, a system-on-a-chip (SoC). The memory controller 10 may be configured with two or more chips. The memory controller 10 may be configured with an integrated circuit (IC) such as a field programmable gate array (FPGA) or an application specific integrated circuit (ASIC). The memory controller 10 is electrically coupled to the NAND memory 20. The memory controller 10 can instruct the NAND memory 20 to perform various operations. The memory controller 10 executes an operation based on a request from the host 2 and an operation that does not directly depend on the request from the host 2. Each function of the memory controller 10 may be implemented by a central processing unit (CPU) that executes a program, may be implemented by dedicated hardware, or may be implemented by a combination thereof.

The memory controller 10 includes a CPU 11, a host interface (I/F) controller 12, a RAM 13, a plurality of NAND controllers 14, and a read only memory (ROM) 15.

The CPU 11 controls the operation of the entire memory controller 10. Based on firmware, the CPU 11 receives and interprets various requests from the host 2, updates and maintains mapping between a logical address and a physical address, generates various commands, and the like, thereby implementing data transfer between the host 2 and the NAND memory 20.

The RAM 13 is a storage area used as a work area of the CPU 11. The RAM 13 stores, for example, parameters for managing the NAND memory 20, and various management tables. The RAM 13 stores, for example, a queue (command queue) of requests received from the host 2. Further, the RAM 13 stores a logical/physical address conversion table for converting a logical address associated with data stored in the NAND memory 20 into a physical address of the NAND memory 20. This logical/physical address conversion table is stored in, for example, the NAND memory 20, read out when the memory system 1 is started, and stored in the RAM 13. The RAM 13 may be configured with a static random access memory (SRAM), a dynamic random access memory (DRAM), or a combination thereof. The configuration of the RAM 13 is not limited thereto.

The host I/F controller 12 is coupled to the host 2 and controls communication between the memory system 1 and the host 2. The host I/F controller 12 controls the transfer of data, requests, and addresses, for example, between the memory system 1 and the host 2. The communication standard supported by the host I/F controller 12 may be any. The host I/F controller 12 may support communication interface standards such as serial advanced technology attachment (SATA), serial attached SCSI (SAS), PCI Express (PCIe), and Non-Volatile Memory Express (NVMe) (registered trademark). That is, the host 2 coupled to the memory system 1 is, for example, a computer conforming to SATA, SAS, PCIe, NVMe, or the like.

The plurality of NAND controllers 14 are coupled to different NAND packages 21 via different channels Ch. 0 to Ch. 3. Each channel of Ch. 0 to Ch. 3 is configured with a wiring group including an input-output (IO) signal line and a control signal line. The IO signal line is, for example, a signal line for communicating data, addresses, and commands. The control signal line is, for example, a signal line for communicating a control signal for controlling the NAND memory 20.

Each channel includes a chip enable signal line CEn, a command latch enable signal line CLE, an address latch enable signal line ALE, a write enable signal line WEn, a pair of read enable signal lines RE/REn, a pair of data strobe signal lines DQS/DQSn, and the IO signal line DQ.

The chip enable signal line CEn is a signal line used for transferring a chip enable signal CEn. The chip enable signal CEn is a signal for enabling the memory chip 100 as an access target. When the NAND package 21 includes a plurality of memory chips 100, each channel may include a plurality of chip enable signal lines CEn.

The IO signal line DQ is a signal line used for transferring a signal DQ. The signal DQ includes a command, address, or data. The IO signal line DQ has a bit width of, for example, 8 bits. The bit width of the IO signal line DQ is not limited thereto.

The command latch enable signal line CLE is a signal line used for transferring a command latch enable signal CLE. The command latch enable signal CLE indicates that the signal DQ transferred to the IO signal line DQ is a command. The NAND controller 14 transfers the command latch enable signal CLE when transferring a command as the signal DQ.

The address latch enable signal line ALE is a signal line used for transferring an address latch enable signal ALE. The address latch enable signal ALE indicates that the signal DQ transferred to the IO signal line DQ is an address. The NAND controller 14 transfers the address latch enable signal ALE when transferring an address as the signal DQ.

The write enable signal line WEn is a signal line for transferring a write enable signal WEn. The write enable signal WEn is a timing signal indicating a timing of taking in a command or address transferred as the signal DQ. Therefore, the command and address are transferred in synchronization with the write enable signal WEn. The NAND controller 14 transfers the write enable signal WEn when transferring a command or address as the signal DQ.

The pair of read enable signal lines RE/REn is a pair of signal lines used for transferring a pair of read enable signals RE/REn. The pair of read enable signals RE/REn are configured as differential signals. The pair of read enable signals RE/REn are timing signals used by the NAND controller 14 to indicate a timing of outputting data, to the memory chip 100 provided in the NAND package 21.

The pair of data strobe signal lines DQS/DQSn is a pair of signal lines for transferring a pair of strobe signals DQS/DQSn. The pair of strobe signals DQS/DQSn are configured as differential signals. The pair of strobe signals DQS/DQSn are timing signals indicating a timing of taking in data at the time of data transfer, to a transfer destination. During a write operation, the NAND controller 14 transmits the pair of strobe signals DQS/DQSn. That is, during the write operation, data is transferred in synchronization with the pair of strobe signals DQS/DQSn transmitted by the NAND controller 14. During a read operation, the memory chip 100 transmits the pair of strobe signals DQS/DQSn. That is, during the read operation, data is transferred in synchronization with the pair of strobe signals DQS/DQSn transmitted by the memory chip 100.

The plurality of NAND controllers 14 control different channels Ch. 0 to Ch. 3. As a result, the plurality of NAND controllers 14 cause each memory chip 100 in the corresponding NAND package 21 to execute a command instructed by the CPU 11.

Each NAND controller 14 includes a register 141, a command sequencer 142, a timer 143, and a NAND I/F 144. The register 141 stores an operating time related to various operations of the memory system 1. The register 141 stores, for example, information on the operating time of the memory chip 100. The information on the operating time of the memory chip 100 is, for example, a design value defined as an alternating current (AC) specification. The AC specification is a predetermined timing constraint that a timing relationship between signals or a timing relationship between the assertion and negation of a certain signal must be satisfied.

The command sequencer 142 transmits a command set and various control signals to the NAND package 21 according to command information generated by the CPU 11. Here, the command information includes the operation content that is to be executed in the NAND package 21. The command sequencer 142 transmits a command set and various control signals by executing a sequencer code stored in the NAND controller 14.

The timer 143 measures the operating time related to various operations of the memory system 1. For example, the information on the operating time of the memory chip 100 is set in the timer 143, and the timer 143 measures the operating time. Each NAND controller 14 may include a plurality of timers 143.

The NAND I/F 144 connects the NAND controller 14 and the NAND package 21 and controls communication between the NAND controller 14 and the NAND package 21. The NAND I/F 144 is configured based on a NAND interface standard.

The ROM 15 stores the firmware, various information, and the like.

Figure 3:
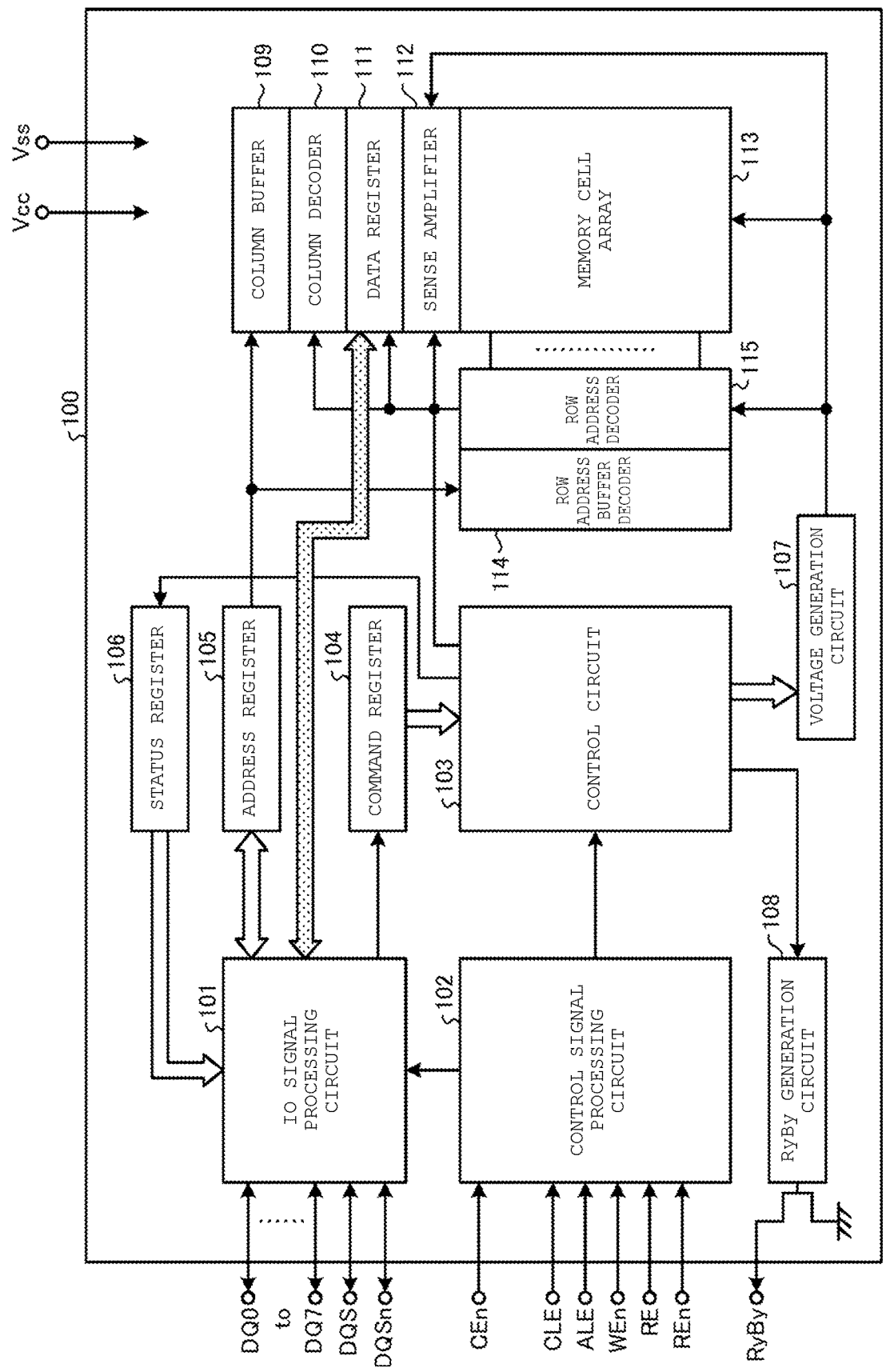
FIG. 3 is a diagram illustrating an example of a configuration of a memory chip according to at least one embodiment.

FIG. 3 is a diagram illustrating a configuration example of each memory chip 100 of at least one embodiment.

The memory chip 100 includes an IO signal processing circuit 101, a control signal processing circuit 102, a control circuit 103, a command register 104, an address register 105, a status register 106, a voltage generation circuit 107, a ready-busy (RyBy) generation circuit 108, a column buffer 109, a column decoder 110, a data register 111, a sense amplifier 112, a memory cell array 113, a row address buffer decoder 114, and a row address decoder 115.

Further, the memory chip 100 includes a Vcc terminal to which electric power is input from a power supply integrated circuit (IC) (not illustrated) provided in the memory system 1 and a Vss terminal to which a ground potential is coupled. The electric power input to the Vcc terminal is supplied to each circuit in the memory chips 100.

The control signal processing circuit 102 receives a control signal, determines whether the IO signal DQ sent to the IO signal processing circuit 101 is a command, an address, or data based on the received control signal, and notifies the IO signal processing circuit 101 of a determination result. Further, the control signal processing circuit 102 transfers the received control signal to the control circuit 103.

The IO signal processing circuit 101 is a buffer circuit for communicating with the IO signal DQ[7:0] to and from the memory controller 10. The IO signal processing circuit 101 can take in the command or address sent as the IO signal DQ[7:0] based on the write enable signal WEn. The IO signal processing circuit 101 can take in the data sent as the IO signal DQ[7:0] based on the pair of strobe signals DQS/DQSn. The IO signal processing circuit 101 stores the command, address, and data sent as the IO signal DQ[7:0] in the command register 104, the address register 105, and the data register 111, respectively.

The address stored in the address register 105 includes a row address and a column address. The row address is sent to the row address buffer decoder 114, and the column address is sent to the column buffer 109.

The control circuit 103 is a state transition circuit (state machine) in which a state shifts based on various control signals received via the control signal processing circuit 102. The control circuit 103 controls the operation of the entire memory chips 100 based on various control signals and commands stored in the command register 104.

Further, the control circuit 103 generates status information indicating a state of operation control or a result of operation control, and stores the status information in the status register 106. The control circuit 103 can output the status information stored in the status register 106 via the IO signal processing circuit 101 in response to a status read command from the memory controller 10.

The RyBy generation circuit 108 shifts the state of a ready-busy signal RyBy between a ready state (Ry) and a busy state (By) under the control of the control circuit 103.

The memory cell array 113 has a configuration in which a plurality of memory cell transistors are arranged. Each of the plurality of memory cell transistors is coupled to a bit line BL and a word line WL. Data received from, for example, the host 2 is stored in the memory cell array 113.

The voltage generation circuit 107 generates various voltages required for access (e.g., write processing, read processing, and erase processing) to the memory cell array 113 based on the electric power input to the Vcc terminal. Then, the voltage generation circuit 107 supplies the generated voltage to each of the sense amplifier 112, the memory cell array 113, and the row address decoder 115.

The row address decoder 115, the column decoder 110, and the sense amplifier 112 execute access (e.g., write processing, read processing, and erase processing) to the memory cell array 113 based on the control by the control circuit 103.

At the time of write processing, the data sent from the NAND controller 14 as the IO signal DQ[7:0] is stored in the data register 111. The processing of storing data in the data register 111 is referred to as data-in processing. The data stored in the data register 111 is stored in the memory cell transistor of the memory cell array 113 by program processing.

At the time of program processing, the column decoder 110 selects the bit line BL corresponding to the column address stored in the column buffer 109. The control circuit 103 sets voltage of the selected bit line BL to zero. The row address decoder 115 selects the word line WL corresponding to the row address stored in the row address buffer decoder 114, and applies a high voltage pulse generated by the voltage generation circuit 107 to the selected word line WL. Then, electrons are injected into the charge storage layer of the memory cell transistor located at the intersection of the selected bit line BL and the selected word line WL, and as a result, the threshold voltage of the memory cell transistor rises. The control circuit 103 continues applying the pulse to the row address decoder 115 until the threshold voltage of the memory cell transistor reaches a target threshold voltage corresponding to the data stored in the data register 111.

At the time of read processing, the sense amplifier 112 pre-charges a voltage Vcc to the bit line BL. The row address decoder 115 selects the word line WL corresponding to the row address stored in the row address buffer decoder 114. The row address decoder 115 puts each of the memory cell transistors coupled to non-selected word lines WL into a conductive state by applying a predetermined voltage Vread generated by the voltage generation circuit 107 to the non-selected word lines WL. Then, the row address decoder 115 sequentially applies, in accordance with the type of read target page, a plurality of types of voltages, which are generated by the voltage generation circuit 107, to the selected word line WL. The sense amplifier 112 identifies the threshold voltage of the target memory cell transistor by identifying the voltage that caused the charge stored in the memory cell transistor due to pre-charging to flow out to the source line and obtains data corresponding to the identified threshold voltage. The sense amplifier 112 stores the acquired data in the data register 111. The processing of acquiring data from the memory cell array 113 by the sense amplifier 112 and storing the data in the data register 111 is referred to as sense processing. The data stored in the data register 111 by the sense processing is sent to the IO signal processing circuit 101 through a data line, and is transferred from the IO signal processing circuit 101 to the NAND controller 14. The processing of transferring the data stored in the data register 111 to the NAND controller 14 is referred to as data-out processing.

Example of Configuration of Memory Cell Array

Figure 4:
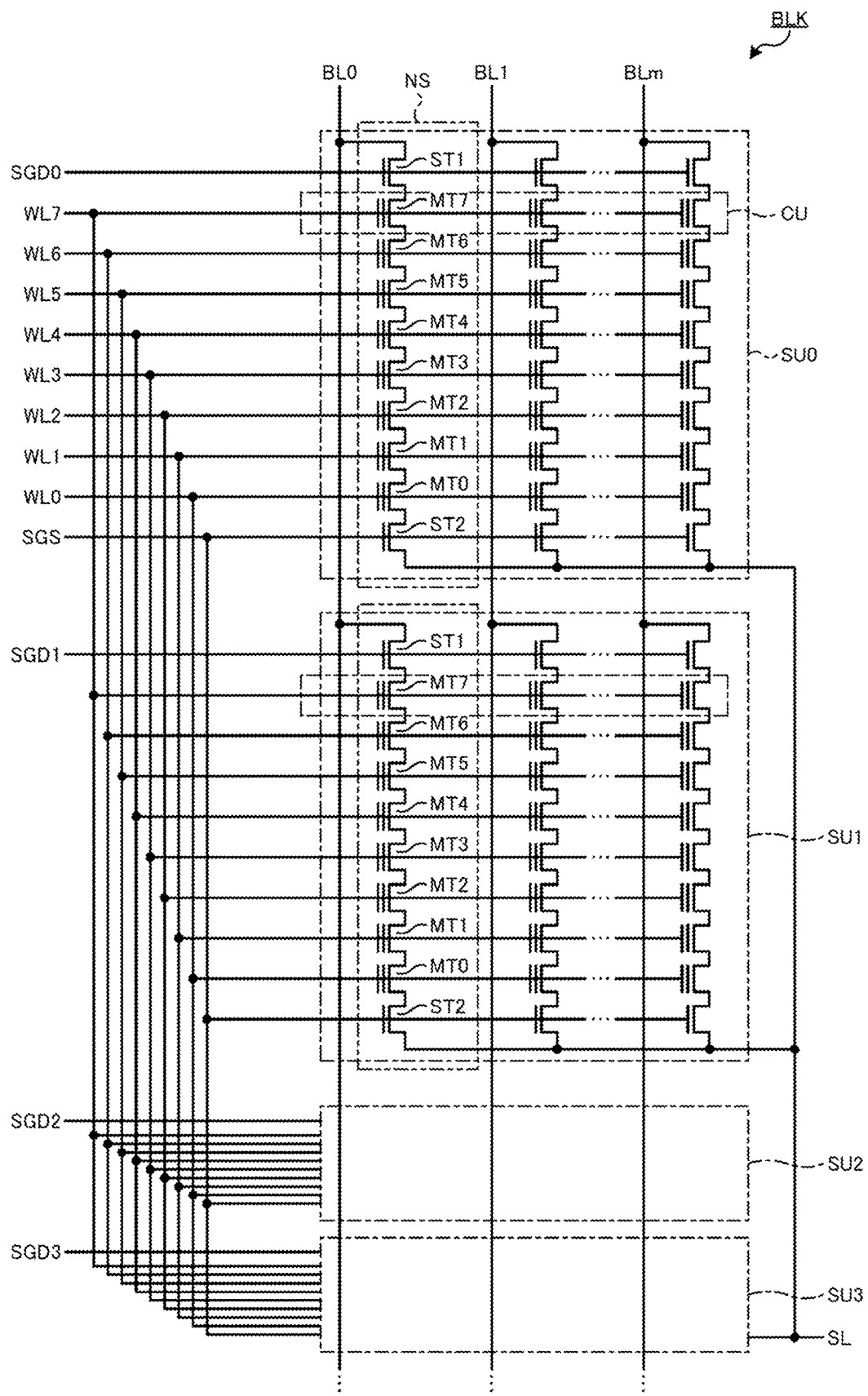
FIG. 4 is a diagram illustrating an example of a configuration of a memory cell array according to at least one embodiment.

FIG. 4 is a diagram illustrating an example of the configuration of the memory cell array 113 according to at least one embodiment. FIG. 4 illustrates a detailed circuit configuration for one block BLK in the memory cell array 113. As illustrated in FIG. 4, the block BLK has, for example, a plurality of string units SU (SU0 to SU3). In the example of FIG. 4, the block BLK includes four string units SU0 to SU3, and the number of which is predetermined.

Each string unit SU includes a plurality of NAND strings NS associated with bit lines BL0 to BLm (m is an integer of 1 or more). Each NAND string NS includes, for example, memory cell transistors MT0 to MT7 and select transistors ST1 and ST2. The number of memory cell transistors MT and select transistors ST provided in one NAND string NS is predetermined.

The memory cell transistor MT includes, for example, a control gate and a charge storage layer, and stores data in a non-volatile manner. The memory cell transistors MT0 to MT7 provided in the NAND string NS are coupled in series between the source of the select transistor ST1 and the drain of the select transistor ST2. The control gate of the memory cell transistor MT0 of each NAND string NS provided in the same block BLK is commonly coupled to a word line WL0. Similarly, the control gates of the memory cell transistors MT1 to MT7 of the plurality of NAND strings NS provided in the same block BLK are commonly coupled to word lines WL1 to WL7, respectively.

In the following description, a plurality of memory cell transistors MT coupled to a common word line WL in each string unit SU will be referred to as a cell unit CU. Further, a group of 1-bit data stored in each memory cell transistor MT provided in the cell unit CU is referred to as a page. Therefore, when 1-bit data is stored in one memory cell transistor MT, the cell unit CU stores one page of data. When 2-bit data is stored in one memory cell transistor MT, the cell unit CU stores two pages of data.

The select transistors ST1 and ST2 are used to select the string unit SU during various operations such as a read operation and a write operation. The drain of the select transistor ST1 provided in the NAND string NS corresponding to the same column address is commonly coupled to the corresponding bit line BL. The gates of the plurality of select transistors ST1 provided in the string unit SU0 are commonly coupled to a select gate line SGD0. Similarly, the gates of the plurality of select transistors ST1 provided in the string units SU1 to SU3 are commonly coupled to select gate lines SGD1 to SGD3, respectively. In the same block BLK, the sources of the plurality of select transistors ST2 are commonly coupled to one source line SL. The gates of the plurality of select transistors ST2 are commonly coupled to one select gate line SGS.

In such a circuit configuration of the memory cell array 113, the word lines WL0 to WL7 are provided for each block BLK. The bit lines BL0 to BLm are shared among a plurality of blocks BLK. The source line SL is shared among, for example, the plurality of blocks BLK. The number of word lines WL and select gate lines SGD and SGS is changed based on the number of memory cell transistors MT and select transistors ST1 and ST2.

Figure 5:
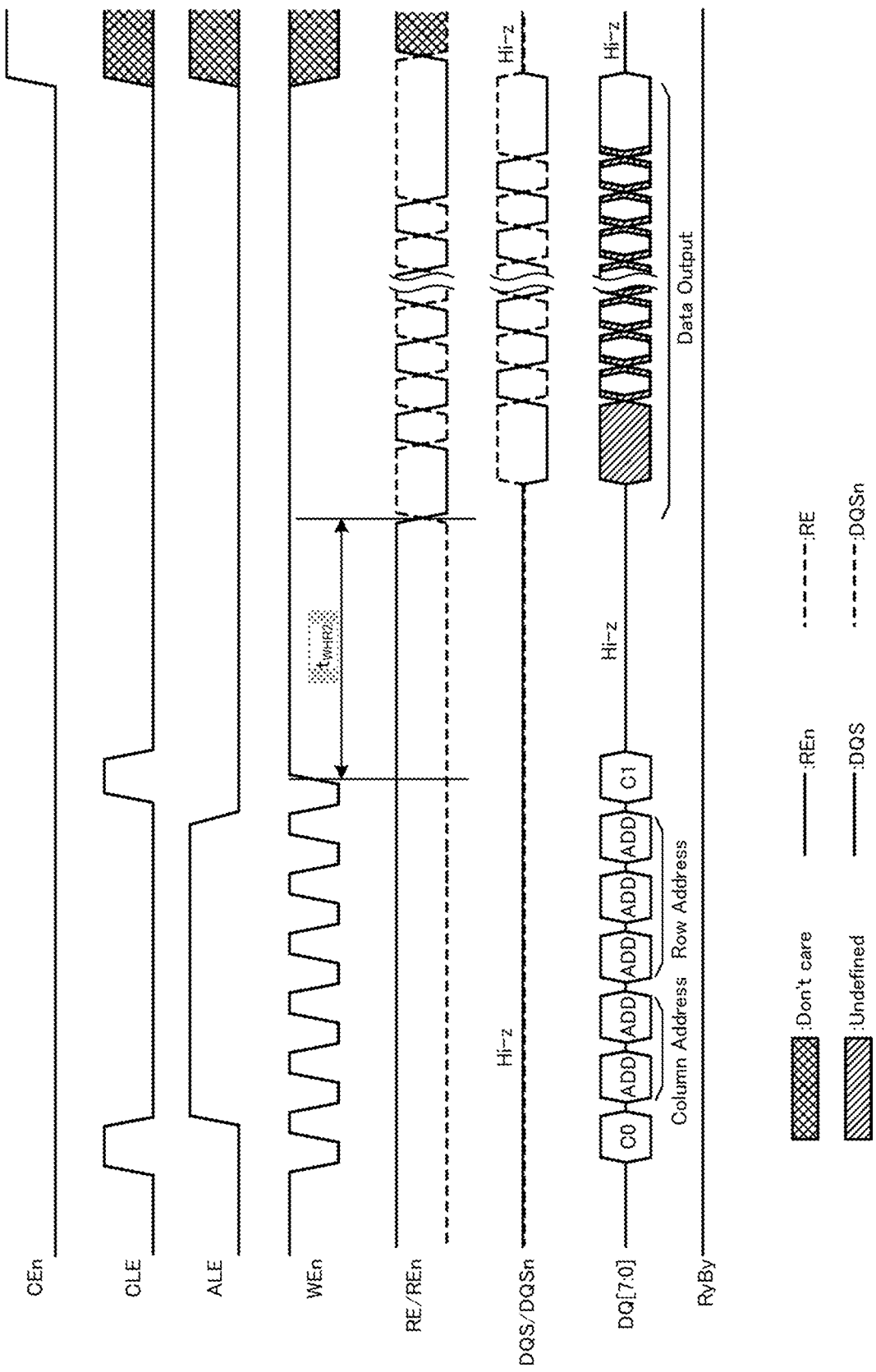
FIG. 5 is a timing diagram illustrating an example of a signal communicated between a NAND controller and the NAND package during a read operation according to at least one embodiment.

FIG. 5 is a timing diagram illustrating an example of a signal communicated between the NAND controller 14 and the NAND package 21 during a read operation according to at least one embodiment. In this drawing, among the signal line group constituting the channel coupling the NAND controller 14 and the NAND package 21, the state of each signal line of the chip enable signal line CEn, the command latch enable signal line CLE, the address latch enable signal line ALE, the write enable signal line WEn, the pair of read enable signal lines RE/REn, the pair of strobe signals DQS/DQSn, the IO signal line DQ[7:0], and the ready-busy signal line RyBy is drawn.

FIG. 5 is a timing diagram of data-out processing in a read operation. The data-out processing is processing of transferring a part or all of the data that has been read from the memory cell array 113 and stored in the data register 111 by a prior sense processing, from the memory chips 100 to the NAND controller 14. The NAND controller 14 transmits a data-out command C0, address information ADD, and a preparation command C1 in this order via the IO signal line DQ[7:0] to cause the memory chip 100 to execute the data-out processing. The set of the data-out command C0, the address information ADD, and the preparation command C1 are referred to as a data-out command set.

When transmitting the data-out command set, the NAND controller 14 maintains the chip enable signal CEn in an active state (e.g., low level). When transmitting the data-out command C0 and the preparation command C1, the NAND controller 14 maintains the command latch enable signal CLE in an active state (e.g., high level). When transmitting the address information ADD, the NAND controller 14 maintains the address latch enable signal ALE in an active state (e.g., high level). When transmitting the data-out command set, the NAND controller 14 toggles the write enable signal WEn.

The data-out command C0 is a command indicating the data-out processing. The address information ADD includes a column address and a row address. The column address indicates the start position of the data for the data-out processing. As the row address, a value equal to the row address specified at the time of the sense processing may be used.

The preparation command C1 is a command indicating preparation for the data-out processing. In response to the preparation command C1, the memory chip 100 prepares to output first 8-bit data (pre-fetched data) for the data-out processing specified by the column address.

The NAND controller 14 starts toggle of the pair of read enable signals RE/REn when time $t_{WHR2}$ defined as the timing constraint elapses after the preparation command C1 is transmitted (more accurately, from the timing of toggling the write enable signal WEn for transmitting the preparation command C1). The instruction by the toggle of the write enable signal WEn to take in the preparation command C1 and the instruction by the toggle of the pair of read enable signals RE/REn for the timing of outputting the data form a series of sequences.

The memory chip 100 generates the pair of strobe signals DQS/DQSn by delaying the pair of read enable signals RE/REn. The memory chip 100 outputs the pair of generated strobe signals DQS/DQSn. The memory chip 100 outputs the data for the data-out processing starting from the start position specified by the column address to the IO signal line DQ[7:0] in synchronization with the pair of strobe signals DQS/DQSn. The NAND controller 14 takes in the data output from the NAND package 21 at a timing synchronized with the pair of strobe signals DQS/DQSn. As a result, the data for the data-out processing is transferred from the memory chip 100 to the NAND controller 14. That is, the data-out processing is executed.

As illustrated in FIGS. 2A and 2B, there may be two types of the NAND package 21, that is, one including the interface chip 211 and one not including the interface chip 211. Depending on whether the NAND controller 14 accesses the NAND package 21 including the interface chip 211 or the NAND package 21 not including the interface chip 211, the time after the preparation command C1 is transmitted until the toggle of the pair of read enable signals RE/REn can be started is different.

Specifically, when the NAND package 21 includes the interface chip 211, after the memory controller 10 transmits the preparation command C1, the control circuit 103 of the memory chip 100 transmits the pre-fetched data that is part of the data stored in the data register 111, to the interface chip 211 via the IO signal processing circuit 101. On the other hand, when the NAND package 21 does not include the interface chip 211, after the memory controller 10 transmits the preparation command C1, the control circuit 103 of the memory chip 100 transmits the pre-fetched data, to the IO signal processing circuit 101.

As described above, when the NAND package 21 includes the interface chip 211, it is necessary to transmit the pre-fetched data to the interface chip 211, and it takes a long time to prepare for the output of the data to be read compared with the case where the NAND package 21 does not include the interface chip 211.

Therefore, if the time $t_{WHR2}$ is set to a fixed time regardless of whether the NAND package 21 includes the interface chip 211, that is, if the time $t_{WHR2}$ is set to a long time corresponding to the case where the NAND package 21 includes the interface chip 211, the memory controller 10 is to wait for a time longer than necessary when the memory controller 10 accesses the NAND package 21 which does not include the interface chip 211.

In the memory system 1 according to at least one embodiment, the timing constraint varies depending on whether the NAND package 21 includes the interface chip 211.

In the memory system 1 according to at least one embodiment, the register 141 stores design values related to different timing constraints depending on whether the NAND package 21 includes the interface chip 211. By executing the sequencer code, the command sequencer 142 transmits a command set and various control signals to the NAND package 21 according to the command information from the CPU 11. The command sequencer 142 uses the design values related to the timing constraints stored in the register 141 for timing control between a plurality of instructions in the transmission of the command set and various control signals.

In the memory system 1, as the design values stored in the register 141, the time $t_{WHR2}$ for the NAND package 21 including the interface chip 211 and the time $t_{WHR2}$ for the NAND package 21 not including the interface chip 211 are stored. The time $t_{WHR2}$ for the NAND package 21 not including the interface chip 211 is shorter than the time $t_{WHR2}$ for the NAND package 21 including the interface chip 211. As a result, when the memory controller 10 accesses the NAND package 21 that does not include the interface chip 211, it is possible to eliminate an unnecessarily long waiting.

It is conceivable that the NAND controller 14 stores different sequencer codes depending on whether the NAND package 21 includes the interface chip 211 or the NAND package 21 does not include the interface chip 211, and the command sequencer 142 switches and executes these sequencer codes. In this case, the number of sequencer codes managed in the memory system 1 increases, and the management cost increases. According to at least one embodiment, the command sequencer 142 that executes the sequencer code refers to the design values stored in the register 141 and executes timing control between a plurality of instructions according to the design values, and it is possible to prevent an increase in the management cost of the sequencer code.

Example of Control Processing in Memory System

Figure 6:
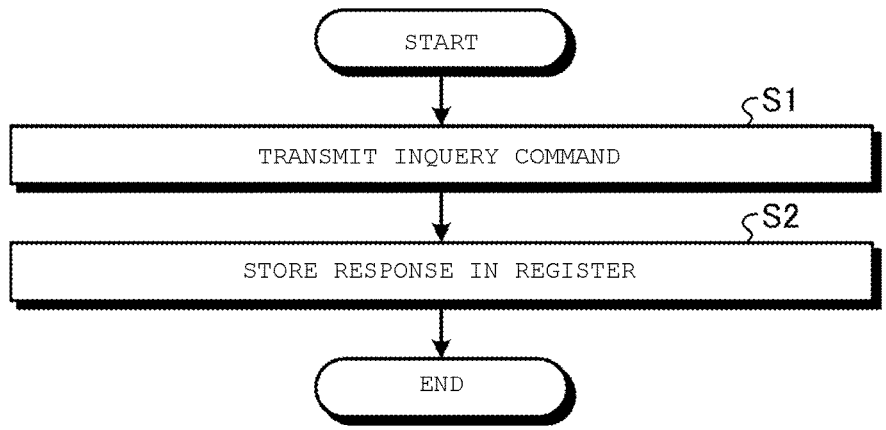
FIG. 6 is a flowchart illustrating a procedure of processing of acquiring a state of the NAND package according to at least one embodiment.
Figure 7:
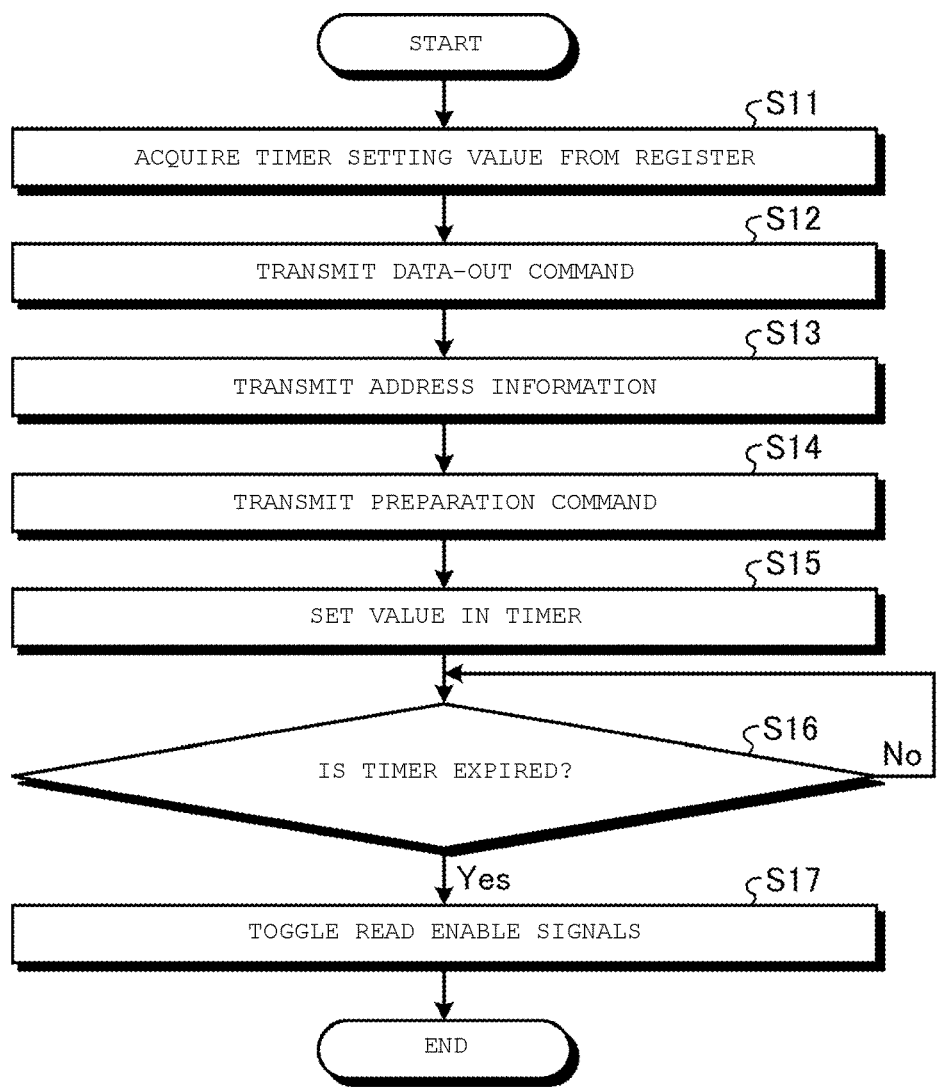
FIG. 7 is a flowchart illustrating a procedure of data-out processing of the read operation according to at least one embodiment.

Here, an example of control processing in the memory system 1 of at least one embodiment will be described with reference to FIGS. 6 and 7. FIG. 6 is a flowchart illustrating a processing procedure in which the NAND controller 14 acquires information on whether the NAND package 21 includes the interface chip 211.

When the NAND controller 14 acquires the command information of a command for inquiring whether the NAND package 21 includes the interface chip 211 from the CPU 11, the NAND controller 14 transmits the command to the NAND package 21 (step S1). As a response of the inquiry command, the CPU 11 acquires information indicating whether the NAND package 21 includes the interface chip 211, and stores this information in the register 141 (step S2).

Subsequently, the procedure of the data-out processing of a read operation according to the present embodiment will be described with reference to FIG. 7.

The command sequencer 142 of the NAND controller 14 acquires a timer setting value based on information indicating whether the NAND package 21 includes the interface chip 211 from the register 141 (step S11). For example, when the NAND package 21 in which a command is to be executed includes the interface chip 211, the time $t_{WHR2}$ for the NAND package 21 including the interface chip 211 is acquired as the timer setting value.

As described above, when a first condition is satisfied that the NAND package 21 in which a command is to be executed includes the interface chip 211, the command sequencer 142 acquires the time $t_{WHR2}$ for the NAND package 21 including the interface chip 211 as the timer setting value. Further, when a second condition is satisfied that the NAND package 21 in which a command is to be executed does not include the interface chip 211, the command sequencer 142 acquires the time $t_{WHR2}$ for the NAND package 21 not including the interface chip 211 as the timer setting value.

The command sequencer 142 transmits the data-out command C0 (step S12). The command sequencer 142 transmits the address information ADD (step S13). The command sequencer 142 transmits the preparation command C1 (step S14). The command sequencer 142 sets the timer setting value acquired in step S11 in the timer 143 (step S15). The command sequencer 142 refers to the timer 143 and determines whether the time $t_{WHR2}$ has elapsed (step S16). When the time $t_{WHR2}$ has elapsed (step S16: Yes), the command sequencer 142 starts toggle of the pair of read enable signals RE/REn (step S17).

In the above-described embodiment, after transmitting the preparation command C1, the command sequencer 142 of the NAND controller 14 measures the time based on the information indicating the state of the NAND package 21. The command sequencer 142 measures different times depending on whether the NAND package 21 includes the interface chip 211 or the NAND package 21 does not include the interface chip 211. This enables the command sequencer 142 to start toggle of the pair of read enable signals RE/REn at a timing when different times elapse depending on whether the NAND package 21 includes the interface chip 211 or the NAND package 21 does not include the interface chip 211.

As described above, the NAND controller 14 controls the timing of giving a specific instruction in a series of sequences that includes a plurality of instructions, based on the state of the NAND package 21. As a result, the NAND controller 14 can appropriately control the memory chip 100 based on the configuration of the NAND package 21.

The register 141 stores information indicating whether the NAND package 21 includes the interface chip 211. The command sequencer 142 of the NAND controller 14 refers to the register 141 and sets the timer setting value in the timer 143. As described above, the command sequencer 142 can control the memory chip 100 at an appropriate timing based on the configuration of the NAND package 21 by referring to the information indicating whether the NAND package 21 includes the interface chip 211.

Further, the NAND controller 14 executes processing of acquiring the state of the NAND package 21 before executing the data-out processing as illustrated in FIG. 5. As a result, the NAND controller 14 can determine whether the NAND package 21 includes the interface chip 211 when executing a sequence such as the data-out processing, and can control the memory chip 100 at an appropriate timing based on the configuration of the NAND package 21.

Further, in the NAND controller 14, the register 141 stores the time $t_{WHR2}$ for the NAND package 21 including the interface chip 211 and the time $t_{WHR2}$ for the NAND package 21 not including the interface chip 211. By referring to the register 141, the command sequencer 142 acquires the time $t_{WHR2}$ for the NAND package 21 including the interface chip 211 or the time $t_{WHR2}$ for the NAND package 21 not including the interface chip 211. In this way, since the command sequencer 142 acquires the time $t_{WHR2}$ stored in the register 141, it is not necessary to prepare a plurality of sequencer codes, and it is possible to prevent an increase in the management cost of the sequencer codes.

Modification Example 1

In the above-described at least one embodiment, the case where the memory controller 10 (more specifically, the command sequencer 142 of the NAND controller 14) executes processing of acquiring information indicating whether the NAND package 21 includes the interface chip 211 has been described. However, at the time of manufacturing the memory system 1, the manufacturer of the memory system 1 may store information indicating whether the NAND package 21 includes the interface chip 211 in the register 141 or the ROM 15.

In this case, the memory controller 10 can control the memory chip 100 at an appropriate timing based on the information indicating the state of the NAND package 21 without executing the processing of acquiring information indicating whether the NAND package 21 includes the interface chip 211.

Modification Example 2

In the above-described at least one embodiment, the memory controller 10 transmits a command for inquiring information indicating whether the NAND package 21 includes the interface chip 211 to the NAND package 21, and the result is stored in the register 141. However, the CPU 11 may include information indicating whether the target NAND package 21 includes the interface chip 211 in the command information.

Here, the procedure of generation processing of the command information will be described with reference to FIG. 8. FIG. 8 is a flowchart illustrating a procedure of generation processing of the command information. Here, it is assumed that the ROM 15 of the memory controller 10 stores a correspondence table in which the information indicating whether the NAND package 21 includes the interface chip 211 and the physical address of the NAND package 21 are associated with each other. Further, it is assumed that the RAM 13 stores the logical/physical address conversion table in which the logical address and the physical address are associated with each other (step S21).

Then, when transmitting the command information to the NAND controller 14, the CPU 11 refers to the RAM 13 to acquire the physical address of the NAND package 21 corresponding to the logical address of an operation target. The CPU 11 determines, based on the physical address stored in the ROM 15, whether the NAND package 21 that is to execute a command based on the command information includes the interface chip 211. Then, the CPU 11 generates the command information including information that indicates whether the NAND package 21 includes the interface chip 211, and transmits the generated command information to the NAND controller 14 (step S22).

FIG. 9 illustrates a processing procedure of the NAND controller 14 in this case. FIG. 9 is a flowchart illustrating a procedure of data-out processing of a read operation according to the present modification.

The command sequencer 142 of the NAND controller 14 acquires the timer setting value corresponding to the information indicating whether the NAND package 21 includes the interface chip 211 from the register 141 based on the command information of the data-out command set generated by the CPU 11 (step S31). The command sequencer 142 transmits the data-out command C0 (step S32). The command sequencer 142 transmits the address information ADD (step S33). The command sequencer 142 transmits the preparation command C1 (step S34). The command sequencer 142 sets the timer setting value acquired in step S31 in the timer 143 (step S35). The command sequencer 142 refers to the timer 143 and determines whether the time $t_{WHR2}$ has elapsed (step S36). When the time $t_{WHR2}$ has elapsed (step S36: Yes), the command sequencer 142 starts toggle of the pair of read enable signals RE/REn (step S37).

As described above, the command information corresponding to the command set includes information indicating whether the NAND package 21 includes the interface chip 211. As a result, it is possible to control the memory chip 100 at an appropriate timing based on the configuration of the NAND package 21 without the NAND controller 14 executing the processing of acquiring information that indicates whether the NAND package 21 includes the interface chip 211.

Modification Example 3

In the above-described example, the case where the register 141 stores the time $t_{WHR2}$ for the NAND package 21 including the interface chip 211 and the time $t_{WHR2}$ for the NAND package 21 not including the interface chip 211 has been described. However, the register 141 may store only one of the time $t_{WHR2}$ for the NAND package 21 including the interface chip 211 and the time $t_{WHR2}$ for the NAND package 21 not including the interface chip 211.

Modification Example 4

In the above-described example, the case where the time $t_{WHR2}$ in the data-out processing is changed depending on whether the NAND package 21 includes the interface chip 211 has been described, but time other than the time $t_{WHR2}$ may be changed as well.

Figure 10:
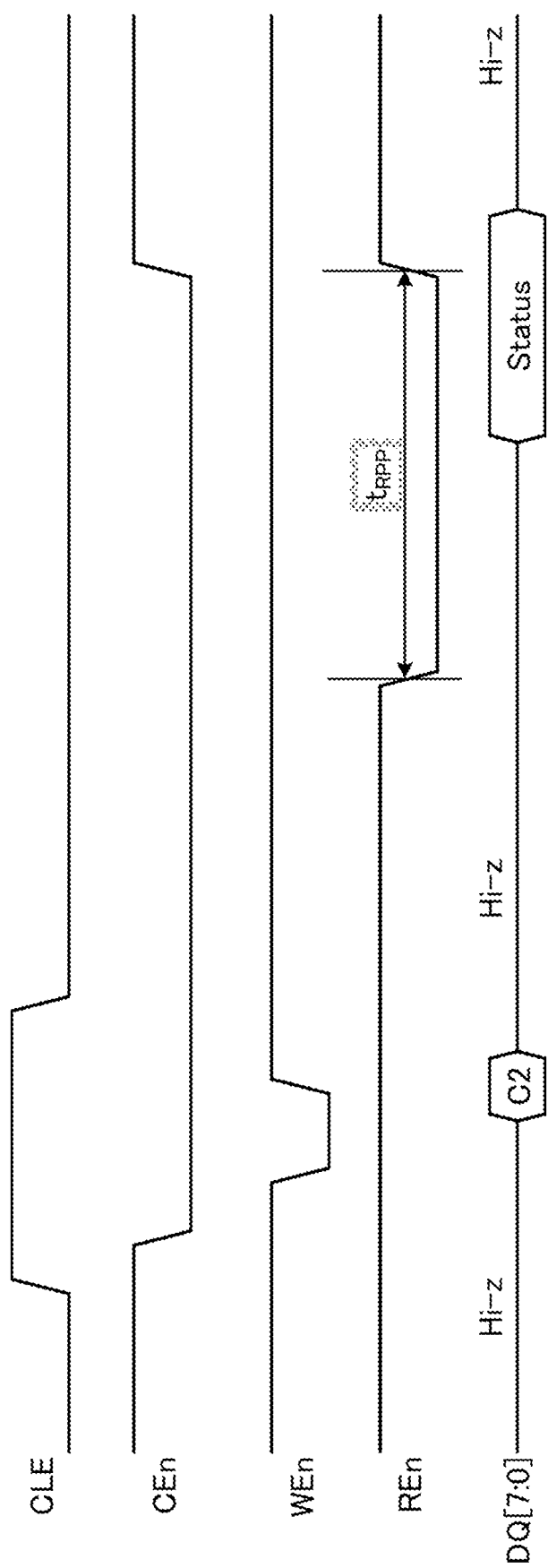
FIG. 10 is a timing diagram of a status read operation according to another modification example.

For example, time $t_{RPP}$ in a status read operation may be changed. FIG. 10 is a timing diagram illustrating an example of a signal communicated between the NAND controller 14 and the NAND package 21 at the time of the status read operation according to the present modification. In this drawing, among the signal line group constituting the channel coupling the NAND controller 14 and the NAND package 21, the state of each signal line of the chip enable signal line CEn, the command latch enable signal line CLE, the write enable signal line WEn, the read enable signal REn of the pair of the read enable signal lines RE/REn, and the IO signal line DQ[7:0] is drawn.

The NAND controller 14 transmits a status read command C2 via the IO signal line DQ[7:0] to read the status information from the memory chip 100. The NAND controller 14 asserts the read enable signal REn. In response to the assertion of the read enable signal REn, the control circuit 103 outputs the status information stored in the status register 106 via the IO signal processing circuit 101. The NAND controller 14 negates the read enable signal REn after the time $t_{RPP}$ has lapsed since asserting the read enable signal REn. The NAND controller 14 may change the time $t_{RPP}$ depending on whether the NAND package 21 includes the interface chip 211.

The NAND controller 14 acquires the status information together with negating the read enable signal REn. The instruction to output the status information by asserting the read enable signal REn and the instruction to acquire the status information by negating the read enable signal REn form a series of sequences.

Modification Example 5

Figure 11:
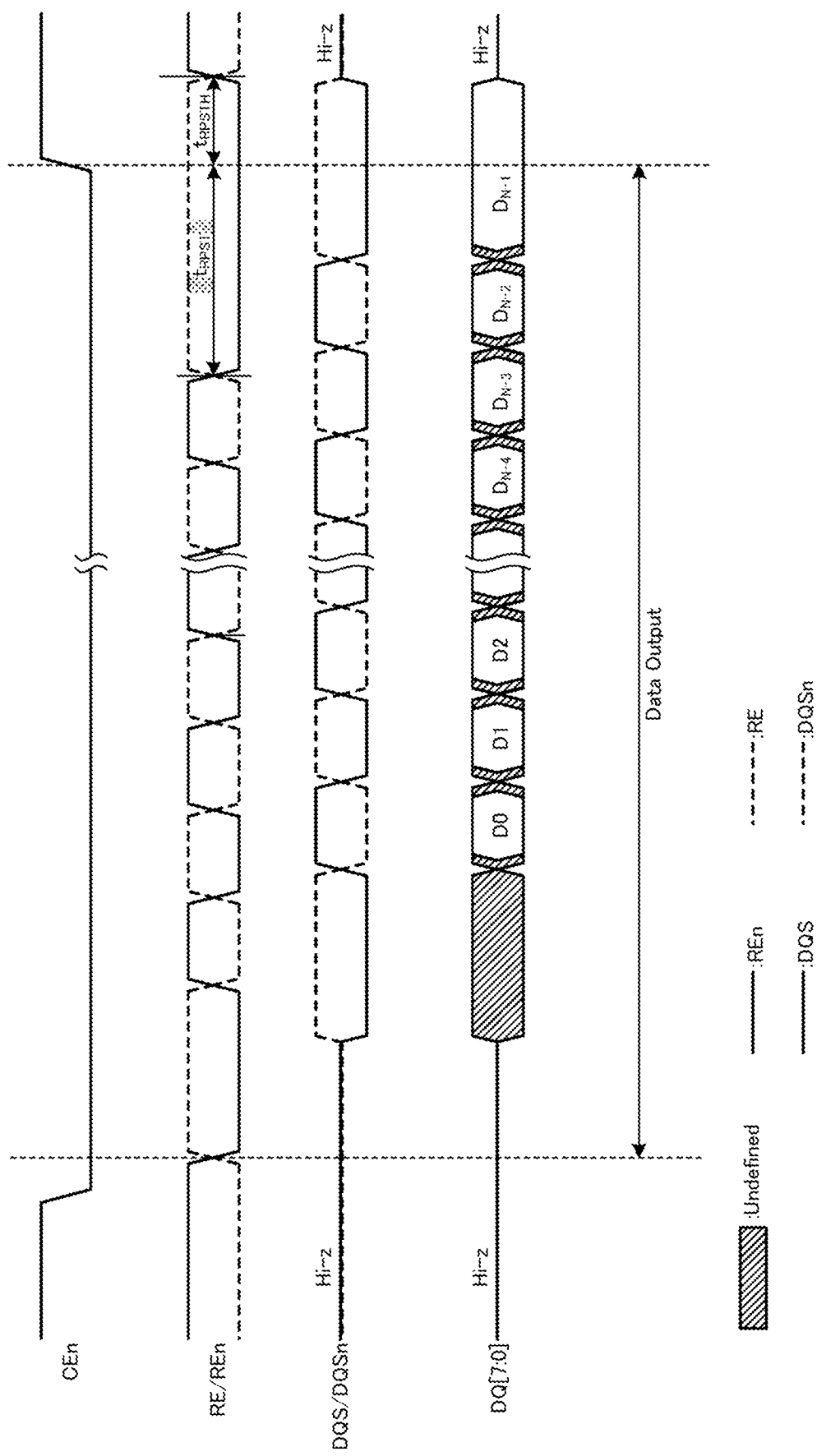
FIG. 11 is a timing diagram illustrating an example of a signal communicated between a NAND controller and a NAND package during a read operation according to still another modification example.

Further, time $t_{RPST}$ and time $t_{RPSTH}$ may be changed in a sequence of data-out processing. FIG. 11 is a timing diagram illustrating an example of a signal communicated between the NAND controller 14 and the NAND package 21 during a read operation according to the present modification. In this drawing, among the signal line group constituting the channel coupling the NAND controller 14 and the NAND package 21, the state of each signal line of the chip enable signal line CEn, the pair of read enable signal lines RE/REn, the pair of strobe signals DQS/DQSn, and the IO signal line DQ[7:0] is drawn.

The NAND controller 14 toggles the pair of read enable signals RE/REn by the number corresponding to the size of target data for the data-out processing. The NAND controller 14 negates the chip enable signal line CEn after the time $t_{RPST}$ has lapsed from the last toggle according to the size of the target data. The NAND controller 14 may change the time $t_{RPST}$ depending on whether the NAND package 21 includes the interface chip 211.

The NAND controller 14 toggles the pair of read enable signals RE/REn again from the negation of the chip enable signal line CEn after the time $t_{RPSTH}$ has lapsed. The NAND controller 14 may change the time $t_{RPSTH}$ depending on whether the NAND package 21 includes the interface chip 211.

The last toggle of the pair of read enable signals RE/REn and the negation of the chip enable signal line CEn form a series of sequences. The negation of the chip enable signal line CEn and the re-toggle of the pair of read enable signals RE/REn form a series of sequences.

Modification Example 6

Figure 12:
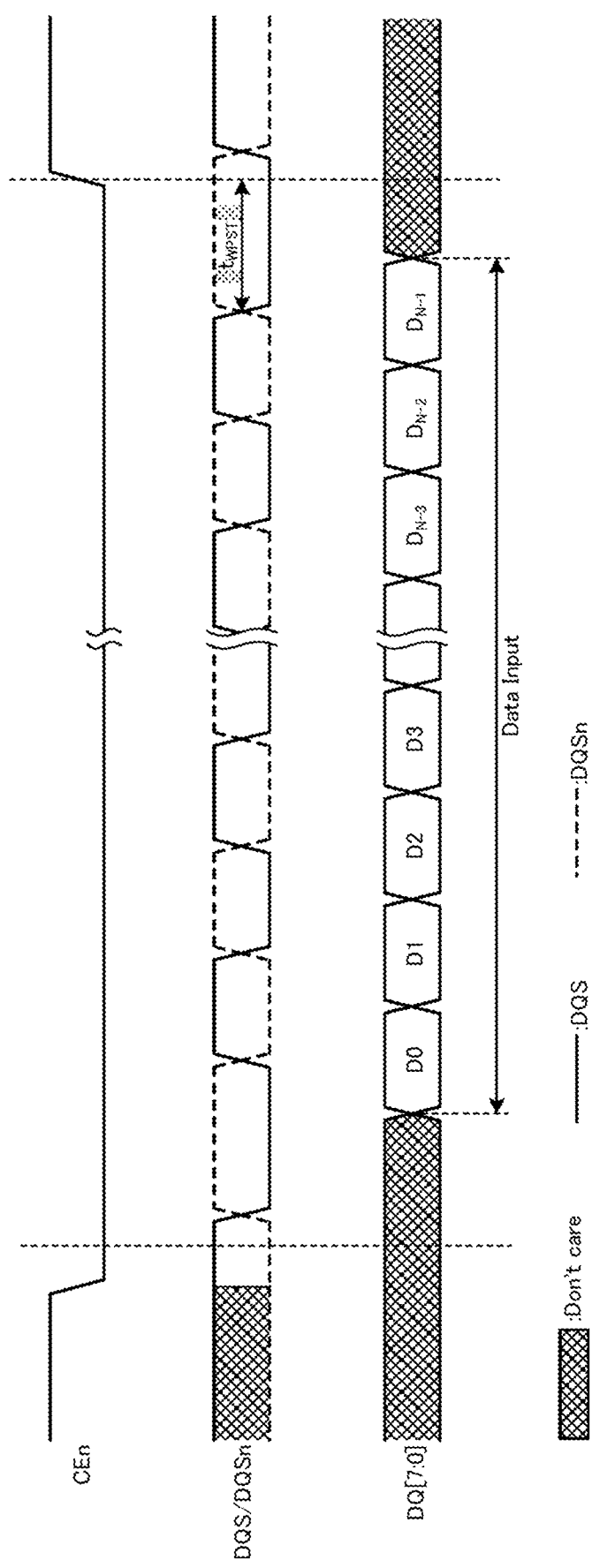
FIG. 12 is a timing diagram illustrating an example of a signal communicated between a NAND controller and a NAND package during a write operation according to still another modification example.

Further, time $t_{WPST}$ in a data-in processing sequence may be changed. FIG. 12 is a timing diagram illustrating an example of a signal communicated between the NAND controller 14 and the NAND package 21 at the time of a write operation according to the present modification. In this drawing, among the signal line group constituting the channel coupling the NAND controller 14 and the NAND package 21, the state of each signal line of the chip enable signal line CEn, the pair of strobe signals DQS/DQSn, and the IO signal line DQ[7:0] is drawn.

The NAND controller 14 toggles the pair of the strobe signals DQS/DQSn by the number corresponding to the size of target data for the data-in processing. The NAND controller 14 negates the chip enable signal line CEn after the time $t_{WPST}$ has lapsed from the last toggle according to the size of the target data. The NAND controller 14 may change the time $t_{WPST}$ depending on whether the NAND package 21 includes the interface chip 211.

The last toggle of the pair of strobe signals DQS/DQSn and the negation of the chip enable signal line CEn form a series of sequences.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:
1. A memory system comprising:
a non-volatile memory including at least one memory chip;
a controller electrically coupled to the non-volatile memory, and configured to:
transmit a first instruction to the non-volatile memory;
transmit a second instruction to the non-volatile memory after transmitting the first instruction, the first instruction and the second instruction forming a series of sequences;
determine whether the non-volatile memory includes an interface chip; and use the determination to control the transmission of the first and second instructions using either a first period or a second period, the second period being different from the first period, wherein in a case where the non-volatile memory includes the interface chip, the second instruction is transmitted to the non-volatile memory after the first period following transmission of the first instruction elapses, and wherein in a case where the non-volatile memory does not include the interface chip, the second instruction is transmitted to the non-volatile memory after the second period following transmission of the first instruction elapses.

2. The memory system according to claim 1, wherein the controller is further configured to store data indicating whether the non-volatile memory includes the interface chip.

3. The memory system according to claim 2, wherein the controller is further configured to, before transmitting the first and second instructions to the non-volatile memory,
transmit a third instruction to the non-volatile memory, and
store data indicating whether the non-volatile memory includes the interface chip based on a response for the third instruction from the non-volatile memory.

4. The memory system according to claim 2, wherein the data indicating whether the non-volatile memory includes the interface chip is generated at the time of manufacture of the memory system.

5. The memory system according to claim 4, wherein the controller is further configured to determine whether to use the first period or the second period based on a correspondence table in which the data indicating whether the non-volatile memory includes the interface chip and a physical address of the non-volatile memory are associated.

6. The memory system according to claim 1, wherein the controller and the non-volatile memory are electrically coupled by a first signal line,
the first instruction is one of assertion and negation of a first signal transmitted from the controller to the non-volatile memory via the first signal line, and
the second instruction is another one of assertion and negation of the first signal.

7. The memory system according to claim 1, wherein the controller and the non-volatile memory are electrically coupled by a first signal line and a second signal line,
the first instruction is assertion of a first signal transmitted from the controller to the non-volatile memory via the first signal line, and
the second instruction is assertion of a second signal transmitted from the controller to the non-volatile memory via the second signal line.

8. The memory system according to claim 1, wherein the controller is further configured to:
transmit, to the non-volatile memory, an instruction indicating a timing of taking in a command for requesting output of data from the non-volatile memory, as the first instruction, and
transmit, to the non-volatile memory, an instruction indicating a timing of output of the data from the non-volatile memory, as the second instruction.

9. The memory system according to claim 1, wherein the controller includes at least one of a system-on-a-chip (SoC), a field programmable gate array (FPGA) or an application specific integrated circuit (ASIC).

10. The memory system according to claim 1, wherein the non-volatile memory includes at least one of a NAND flash memory, a magnetoresistive random access memory (MRAM), a phase change random access memory (PCRAM), or a resistive random access memory (ReRAM).

11. A method of controlling a plurality of non-volatile memories each having at least one memory chip, the plurality of the non-volatile memories including at least a first non-volatile memory and a second non-volatile memory, the method comprising:
transmitting a first instruction to the first non-volatile memory and the second non-volatile memory; and
determining that the first non-volatile memory includes an interface chip;
in response to determining that the first non-volatile memory includes the interface chip, transmitting a second instruction to the first non-volatile memory after transmitting the first instruction, the first instruction and the second instruction forming a series of sequences,
determining that the second non-volatile memory does not include the interface chip; and
in response to determining that the second non-volatile memory does not include the interface chip, transmitting the second instruction to the second non-volatile memory after a second period following the first instruction elapses, the second period being different from the first period.

12. The method according to claim 11, further comprising:
storing data indicating whether the plurality of the non-volatile memories each includes the interface chip.

13. The method according to claim 12, wherein the plurality of the non-volatile memories are each included in a memory system, and the data indicating whether the plurality of the non-volatile memories each includes the interface chip is generated at the time of manufacturing the memory system.

14. The method according to claim 13, further comprising:
using either the first period or the second period based on a correspondence table in which the data indicating whether the plurality of the non-volatile memories each includes the interface chip and a physical address of the plurality of the non-volatile memories are associated.

15. The method according to claim 11, further comprising:
before transmitting the first and second instructions to the first non-volatile memory and the second non-volatile memory,
transmitting a third instruction to the first non-volatile memory and the second non-volatile memory, and
storing data indicating whether the first non-volatile memory and the second non-volatile memory each includes the interface chip based on a response for the third instruction from the first non-volatile memory and the second non-volatile memory.

16. The method according to claim 11, further comprising:
communicating with each of the plurality of the non-volatile memories by a first signal line, wherein
the first instruction is one of assertion and negation of a first signal transmitted to each of the plurality of the non-volatile memories via the first signal line, and the second instruction is another one of assertion and negation of the first signal.

17. A method of controlling a non-volatile memory having at least one memory chip, the non-volatile memory included in a memory system, the method comprising:
   determining whether the non-volatile memory includes an interface chip;
   determining a period according to the determination;
   transmitting a first instruction to the non-volatile memory;
   transmitting a second instruction to the non-volatile memory after the determined period following the first instruction elapses, the first instruction and the second instruction forming a series of sequences; and
   storing data indicating whether the non-volatile memory includes the interface chip, the data generated at the time of manufacturing the memory system.

18. The method of according to claim 17, further comprising:
   before transmitting the first and second instructions to the non-volatile memory,
      transmitting a third instruction to the non-volatile memory, and
      storing data indicating whether the non-volatile memory includes the interface chip based on a response for the third instruction from the non-volatile memory.

* * * * *